(12) United States Patent
Gauché

(10) Patent No.: US 9,932,749 B2
(45) Date of Patent: Apr. 3, 2018

(54) SUPPORTING FRAME ASSEMBLY

(71) Applicant: STELLENBOSCH UNIVERSITY, Stellenbosch (ZA)

(72) Inventor: Paul Gauché, Stellenbosch (ZA)

(73) Assignee: STELLENBOSCH UNIVERSITY, Stellenbosch (ZA)

( * ) Notice: Subject to any disclaimer, the term of this patent is extended or adjusted under 35 U.S.C. 154(b) by 57 days.

(21) Appl. No.: 15/092,997

(22) Filed: Apr. 7, 2016

(65) Prior Publication Data

US 2016/0298354 A1    Oct. 13, 2016

(30) Foreign Application Priority Data

Apr. 7, 2015    (ZA) ................... 2015/02248

(51) Int. Cl.
| | |
|---|---|
| *E04H 12/20* | (2006.01) |
| *F16M 11/24* | (2006.01) |
| *F24J 2/52* | (2006.01) |
| *E04H 12/22* | (2006.01) |

(Continued)

(52) U.S. Cl.
CPC ......... *E04H 12/20* (2013.01); *E04H 12/2292* (2013.01); *F16M 11/24* (2013.01); *F24J 2/5203* (2013.01); *F24J 2/5233* (2013.01); *F24J 2/5239* (2013.01); *F24J 2/5264* (2013.01); *E04H 2012/006* (2013.01); *F24J 2/5232* (2013.01); *H02S 30/10* (2014.12); *Y02E 10/47* (2013.01)

(58) Field of Classification Search
CPC ............ E04H 12/2292; E04H 2012/006; F24J 2/5203; F24J 2/5233; F24J 2/5239; F24J 2/5264; F24J 2/523
See application file for complete search history.

(56) References Cited

U.S. PATENT DOCUMENTS

| | | | |
|---|---|---|---|
| 835,281 A | * 11/1906 | Haskell | ................... E04H 12/10 52/651.04 |
| 1,787,167 A | * 12/1930 | Purdy | ................... E04B 1/2604 16/249 |

(Continued)

FOREIGN PATENT DOCUMENTS

| | | | |
|---|---|---|---|
| EP | 2136155 A1 | * 12/2009 | ............... F24J 2/542 |
| GB | 2214944 A | * 9/1989 | |

(Continued)

*Primary Examiner* — Charles A Fox
*Assistant Examiner* — Charissa Ahmad
(74) *Attorney, Agent, or Firm* — Osha Liang LLP

(57) ABSTRACT

A supporting frame includes a truss composed of an upper straight frame member and a parallel lower straight frame member supported at their ends in spaced relationship relative to each other. At least two spans of divergent inclined brace member extend between them with the ends of the brace member spans each being securable to the upper or lower straight frame member by means of a fastener. Limited relative longitudinal movement of the upper and lower straight frame members is permitted before a fastener is secured to fix the positions at which the ends of the brace member spans are attached to the upper and lower straight frame members. In one application two trusses meet at a corner with a pylon being urged in the plane of the supporting frame into a corner between two frame members of each pair of trusses to extend at right angles to the frame.

8 Claims, 6 Drawing Sheets

(51) Int. Cl.
*H02S 30/10* (2014.01)
*E04H 12/00* (2006.01)

(56) References Cited

U.S. PATENT DOCUMENTS

| | | | | |
|---|---|---|---|---|
| 1,813,373 A * | 7/1931 | Wooldridge | E04C 3/08 | 52/691 |
| 1,865,059 A * | 6/1932 | Ragsdale | E04C 3/09 | 52/691 |
| 2,030,262 A * | 2/1936 | Maddock | B23Q 11/0003 | 14/73.1 |
| 2,906,551 A * | 9/1959 | May | E04G 7/18 | 256/59 |
| 3,043,409 A * | 7/1962 | Kremer | A47B 96/1408 | 52/633 |
| 3,247,629 A * | 4/1966 | Behlen | E04B 7/08 | 52/694 |
| 3,314,209 A * | 4/1967 | Troutner | E04C 3/07 | 52/639 |
| 3,318,561 A * | 5/1967 | Finke | H01Q 1/1228 | 248/218.4 |
| 3,330,087 A * | 7/1967 | Troutner | E04C 3/07 | 403/217 |
| 3,386,222 A * | 6/1968 | Troutner | E04C 3/07 | 52/693 |
| 3,409,259 A * | 11/1968 | Cross | A63B 3/00 | 24/277 |
| 3,422,591 A * | 1/1969 | Troutner | E04C 3/292 | 403/384 |
| 3,564,783 A * | 2/1971 | Dunne | E04C 3/08 | 248/219.1 |
| 3,570,204 A * | 3/1971 | Birkemier | E04C 3/292 | 52/289 |
| 3,885,365 A * | 5/1975 | Cox | E04F 11/0255 | 182/1 |
| 3,925,942 A * | 12/1975 | Hemmelsbach | E04B 1/3205 | 135/122 |
| 3,946,532 A * | 3/1976 | Gilb | E04C 3/292 | 411/477 |
| 4,007,573 A * | 2/1977 | Gilb | E04B 1/2608 | 403/188 |
| 4,094,116 A * | 6/1978 | Gilb | E04C 3/292 | 403/217 |
| 4,214,841 A * | 7/1980 | Hayashi | E04G 7/14 | 403/188 |
| 4,565,185 A * | 1/1986 | Mori | F24J 2/5417 | 126/569 |
| 4,624,599 A * | 11/1986 | Piasecki | B64C 1/06 | 244/131 |
| 4,957,186 A * | 9/1990 | Reetz | E04C 3/08 | 248/284.1 |
| 5,145,030 A * | 9/1992 | Pavlescak | E04G 5/14 | 182/113 |
| 5,787,673 A * | 8/1998 | Noble | E04H 12/085 | 343/890 |
| 5,920,291 A * | 7/1999 | Bosley | H01Q 1/1207 | 343/879 |
| 6,043,795 A * | 3/2000 | Strieffler | H01Q 1/125 | 343/880 |
| 6,225,962 B1 * | 5/2001 | Blanchard | H01Q 1/125 | 248/514 |
| 6,499,266 B1 * | 12/2002 | Macumber | E04C 3/08 | 52/632 |
| 6,561,473 B1 * | 5/2003 | Ianello | E04G 7/14 | 248/214 |
| 6,732,836 B2 * | 5/2004 | Ono | E04G 5/14 | 182/113 |
| 6,752,438 B2 * | 6/2004 | DeSouza | E05B 65/0007 | 16/235 |
| 7,086,207 B2 * | 8/2006 | Piburn | H01Q 1/1207 | 248/512 |
| 7,113,145 B1 * | 9/2006 | Noble | H01Q 1/1228 | 248/218.4 |
| 7,659,865 B2 * | 2/2010 | Kreitzberg | H01Q 1/1235 | 343/880 |
| 7,677,009 B2 * | 3/2010 | Bowman | E04B 7/022 | 52/309.7 |
| 8,534,026 B2 * | 9/2013 | Bauman | E04C 3/32 | 52/223.4 |
| 8,959,868 B2 * | 2/2015 | Robinson | E04C 3/08 | 403/408.1 |
| 8,981,201 B2 * | 3/2015 | Sinclair | F24J 2/38 | 136/243 |
| 9,217,230 B2 * | 12/2015 | Wallace | E01F 15/0423 | |
| 9,255,396 B2 * | 2/2016 | Eberhart | F16B 7/044 | |
| 2003/0041856 A1 * | 3/2003 | Blackmon | F24J 2/07 | 126/680 |
| 2004/0211146 A1 * | 10/2004 | Weeks | E04C 3/07 | 52/633 |
| 2005/0217936 A1 * | 10/2005 | Jolicoeur | E01D 19/106 | 182/130 |
| 2008/0053032 A1 * | 3/2008 | Hockemeyer | E04B 7/024 | 52/651.07 |
| 2009/0007901 A1 * | 1/2009 | Luconi | F24J 2/5239 | 126/627 |
| 2009/0025775 A1 * | 1/2009 | Parra Cebrian | F24J 2/5233 | 136/230 |
| 2010/0192506 A1 * | 8/2010 | Allred, III | E04C 3/08 | 52/655.1 |
| 2013/0008431 A1 * | 1/2013 | Fitch | F24J 2/4638 | 126/601 |
| 2014/0117190 A1 * | 5/2014 | Werner | F24J 2/14 | 248/346.03 |
| 2014/0150845 A1 * | 6/2014 | Chang | F24J 2/38 | 136/246 |
| 2015/0060605 A1 * | 3/2015 | Tserodze | F24J 2/523 | 244/172.6 |
| 2015/0292773 A1 * | 10/2015 | Malan | F24J 2/523 | 211/41.14 |
| 2016/0298804 A1 * | 10/2016 | Landman | F24J 2/5233 | |

FOREIGN PATENT DOCUMENTS

JP 09195381 A * 7/1997
WO 2014072905 A1 5/2014

* cited by examiner

SUPPORTING FRAME ASSEMBLY

CROSS-REFERENCE(S) TO RELATED APPLICATIONS

This application claims priority from South African provisional patent application number 2015/02248 filed on 7 Apr. 2015, which is incorporated by reference herein.

FIELD OF THE INVENTION

This invention relates to a supporting frame assembly that may, for example, be used to support items such as pylons used in turn to support items such as heliostats, photovoltaic panels, water heating panels whether they be of the flat panel type or composed of multiple vacuum tubes, wind turbines (aerofoil powered generators) or other wind activated machines, or any other items that require stable support in a particular place, generally an outdoors space.

More particularly, the invention relates to supporting frame assemblies of a generally polygonal shape in plan view.

BACKGROUND TO THE INVENTION

Support frame assemblies of the type with which this invention is concerned are often used in regions in which a generally horizontal support surface may undulate, at least to some extent, that renders conventional supporting frame assemblies that employ rigid trusses arranged in a polygonal configuration inappropriate or, at least to some extent ineffective, in view of the different heights at which different parts of a supporting frame assembly become supported.

A conventional rigid truss may be composed of a pair of parallel spaced frame members interconnected by multiple diagonal braces or struts that together form a rigid and unyielding truss. Typically the ends of a truss are rigidly connected to an item being supported by the frame. In instances in which the item being supported is required to be in a generally particular orientation, such as generally upright in the case of a pylon, such an arrangement does not work effectively.

For example, in the instance of a supporting frame to which a pylon supported heliostat is attached, the focusing of reflected solar energy accurately towards a central tower receiver is imperative and consequently the stability of the supporting frame and pylon must ensure the necessary accuracy that in turn depends on the stability of the supporting frame and pylon. Also, it should be noted that support structures for the heliostats in such an application are responsible for an appreciable proportion of the capital expenditure on an entire installation.

In consequence of this, the development of more stable and less costly support structures has been an ongoing challenge and one support structure that has been evolved forms the subject matter of our published international patent application WO2014072905. As shown in accompanying FIG. 1, the support structure in that instance provides a supporting frame supporting a stable pylon (A) for each heliostat (B) and the pylons are arranged in a triangular pattern with the pylons being secured together by girders (C), preferably in the form of trusses, secured to projecting plates (D) welded to the pylons and forming a framework therewith. It is considered that this arrangement will work effectively when installed on relatively even ground but may be somewhat problematical on at least some types of undulating ground. It also involves a significant amount of welding that contributes to the cost of the support structure and welds require additional corrosion protection. The latter applies particularly to the type of trusses employed.

It is considered that there is yet appreciable scope for improvement in an arrangement of pylons and a supporting frame for purposes such as this or for supporting any other items such as those identified above.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with this invention there is provided a supporting frame including a truss composed of an upper straight frame member and a generally parallel lower straight frame member with each of the frame members being operatively supported at or towards its ends in spaced relationship relative to each other and wherein at least two spans of divergent inclined brace member extend between the upper and lower straight frame members with the ends of the brace member spans each being securable to the upper or lower straight frame member by means of a fastener associated with it, wherein limited relative longitudinal movement of the upper and lower straight frame members is allowed to take place prior to a fastener associated with at least one end of each brace member span being secured to fix the positions at which the ends of the brace member spans are attached to the upper and lower straight frame members.

Further features of the invention provide for ends of the spans of brace member that are closer together to be physically joined, typically by being integral with each other; for the brace member spans to be of deformable material that may be tubular or of a suitable section such as angle section or channel section in which instance the free ends are flattened and secured to one of the lower or upper straight frame members with a flattened central region being perforated to accommodate the fastener or fasteners that is conveniently one or more bolts or rivets passing through the central flattened region that has an elongate longitudinal slot allowing for longitudinal adjustment of the relative positions of the upper and lower straight frame members to relieve or avoid stresses that may be occasioned by undulations in a supporting surface; and for the upper and lower straight frame members to also be tubular or of a suitable section such as angle section or channel section and to have their ends flattened for attachment to corresponding ends of cooperating upper and lower straight frame members of co-operating trusses or for attachment to different items or anchorage points.

It will be appreciated that the fastener assemblies may be releasable such as in the instance of screw threaded fasteners or they may be of the rivet type that are considerably more permanent but in at least many instances appreciably less expensive. Releasable fasteners clearly provide the advantage that should be supporting surface of a frame move somewhat to cause stresses to be developed in the truss, the releasable fasteners can be loosened and retightened to accommodate longitudinal movement of the upper and lower straight frame members relative to each other.

It is a particular feature of the invention that the trusses be used to support multiple upright pylons from a generally horizontal supporting frame assembly in which each pylon is height adjustable relative to the plane of the frame assembly and has associated with it a releasable clamping assembly for clamping each pylon such that the pylon and supporting frame assembly can be supported on a supporting surface with multiple pylons having their lowermost ends engaging the supporting surface.

Preferably, the brace member spans are limited in number to one elongate tubular brace member unit having two divergent brace member spans for each span of frame members between adjacent pylons or other items being supported by the supporting frame assembly.

In accordance with a second aspect of the invention there is provided a supporting frame assembly as defined above in combination with height adjustable pylons and in which the supporting frame assembly includes at least two trusses meeting at a corner with the frame members of each truss being generally co-planar and the pylons being urged in the plane of the supporting frame into a corner between the frame members of each pair of trusses so as to extend at generally right angles to a plane including the two frame members, and at least one fastener assembly having two end portions each of which is anchored relative to its associated frame member so as to extend transversely relative to the associated frame member and wherein the fastener assembly includes an intermediate saddle portion engaging a surface of the pylon that is directed outwardly relative to the corner so that the pylon is urged by the fastener assembly into the corner when the fastener assembly is tightened to thereby engage the pylon and lock it axially relative to the frame members in a selected position.

Further features of the second aspect of the invention provide for each of the end portions of the fastener assembly to pass through the associated frame member with a head or nut engaging an outside of the associated frame member to anchor it relative to the frame member; for the fastener assembly to be a single elongate fastener having an arcuate central saddle portion formed to closely follow the outer surface of the pylon and two straight end portions that constitute said end portions; for the angle at which the frame members meet each other to be a right angle or an acute angle, preferably about 60°, for the surface of the frame members engaged by the pylon to be pre-formed to provide a contact surface conforming substantially to the outer surface of the pylon; and for the frame members to be tubular frame members or sections made of a deformable metal that can be pressed to provide said contact surfaces and flattened and perforated towards their ends that are bolted together.

In order that the invention may be more fully understood one embodiment incorporating both aspects of the invention will now be described with reference to the accompanying drawings.

DETAILED DESCRIPTION WITH REFERENCE TO THE DRAWINGS

Figure 1:
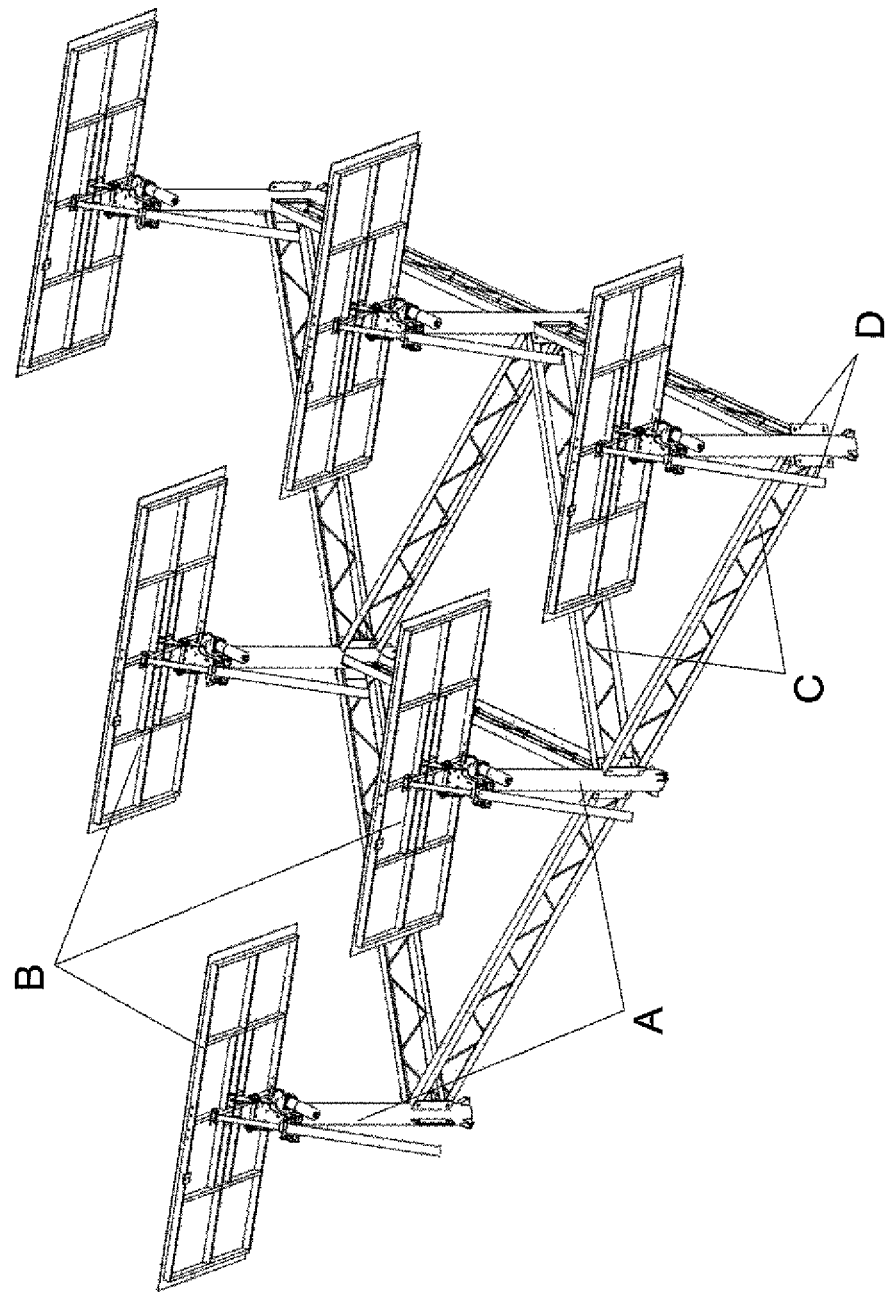
FIG. 1 is illustrates in three-dimensional view one example of prior art type of pylon and supporting frame assembly of the general nature with which this invention is concerned.

In the embodiment of the invention illustrated in FIGS. 2 to 9 of the drawings, the invention is applied to a supporting frame assembly (1) that supports multiple height adjustable pylons (2) that, in this particular instance, may be used to support heliostats, as indicated above. The supporting frame assembly in this instance has multiple frame member arranged in pairs to form trusses each composed of an upper straight frame member (3) and a parallel lower straight frame member (4) with the two frame members being held in parallel relationship by inclined brace members (5) extending between the upper and lower straight frame members. The free ends (6) of the frame members are flattened and perforated to receive connecting bolts (7) passing through overlapped flattened ends.

The brace members are of tubular metal and have flattened ends (8) that are also perforated to accommodate bolts (9) passing through them and a flattened central region (11) has an elongate slot (12) that allows for longitudinal adjustment of the relative positions of the two straight frame members to accommodate any undulations in a support surface on which the pylons and supporting frame assembly are located. The brace elements intercept the upper straight frame member in order to strengthen it for people to stand on it whilst the lower frame member is less important from this perspective due to its generally close proximity to the ground which is typically not movable. The braces thus diverge from the central flattened central region.

Figure 2:
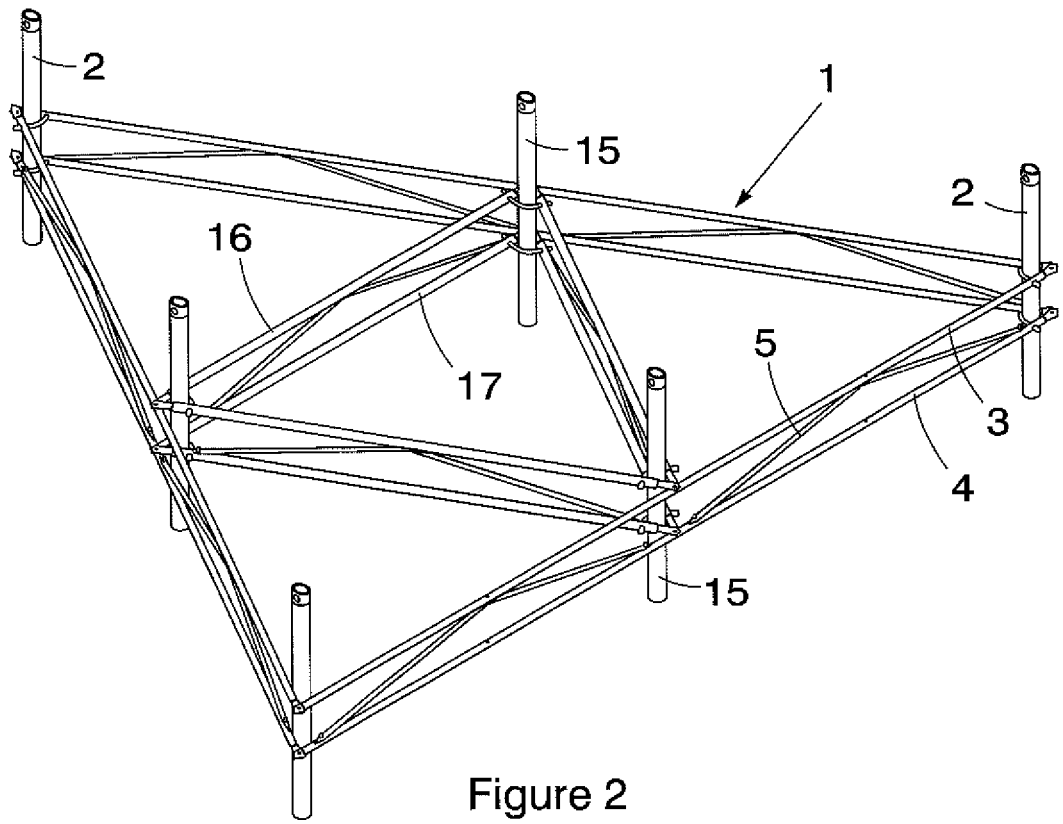
FIG. 2 is a similar three-dimensional view of an equivalent pylon and supporting frame assembly to which the present invention has been applied.

In the particular instance of the frame assembly illustrated in FIG. 2, the main supporting frame is of equilateral triangular shape in plan view with a side of the triangle being dimensioned to correspond with a standard commercially available length of metal tube, such as 6 meters, for example. A pylon (2) is supported by the frame at each corner of the main supporting frame at a corner that makes an angle of 60° between the frame members of the trusses.

In addition, three intermediate pylons (15) are supported midway between the corners of the main frame assembly in the corners of a triangular sub-frame that has its upper straight frame members (16) and lower straight frame members (17) of the trusses attached to the midpoints of the main frame members (3, 4). In this manner corners are generated in the supporting sub-frame assembly to accommodate three intermediate pylons (15). For economy of tubular material, each of the frame members of the sub-frame assembly is made to one half of a standard commercially available length of metal tube, in this instance 3 meters.

Figure 3:
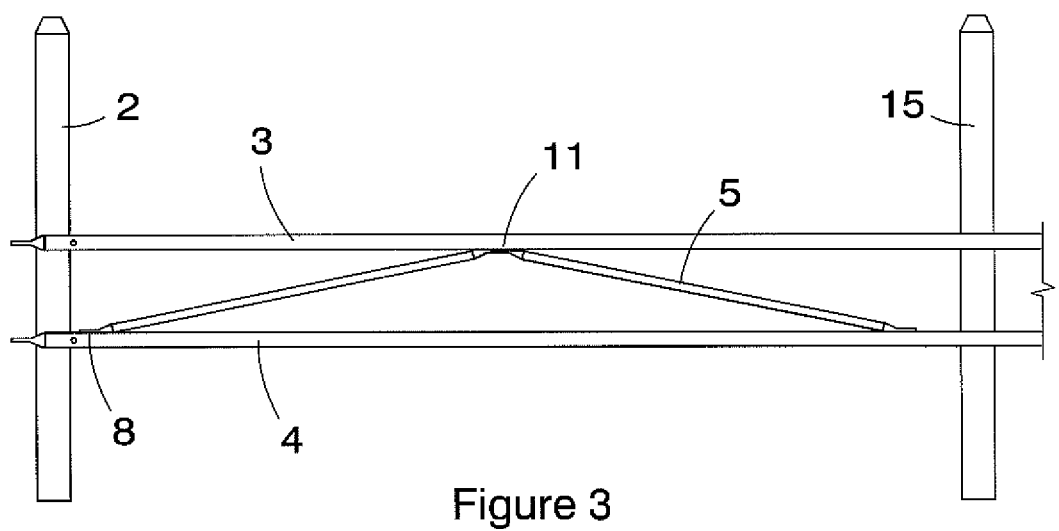
FIG. 3 is an elevation showing one half of one side or span of the assembly illustrated in FIG. 2.
Figure 4:
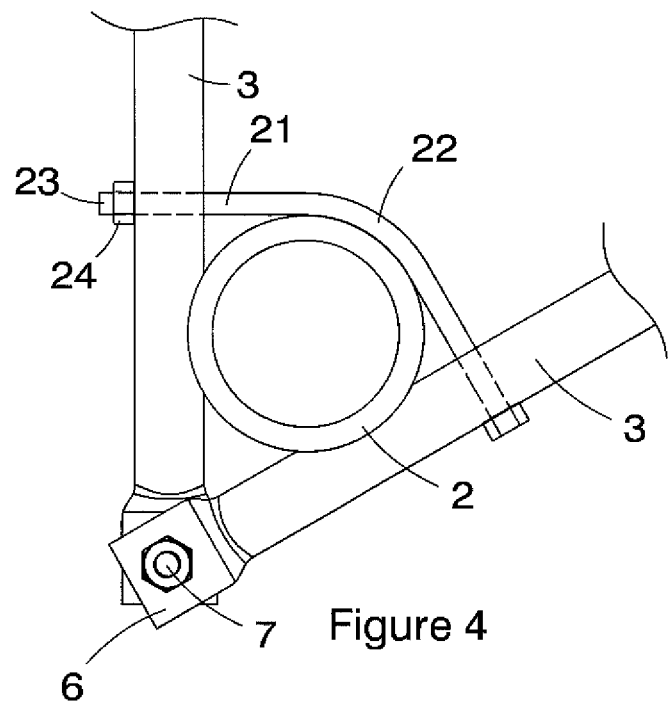
FIG. 4 is a schematic plan view showing one pylon and its relationship with an associated corner of the supporting frame assembly.
Figure 5:
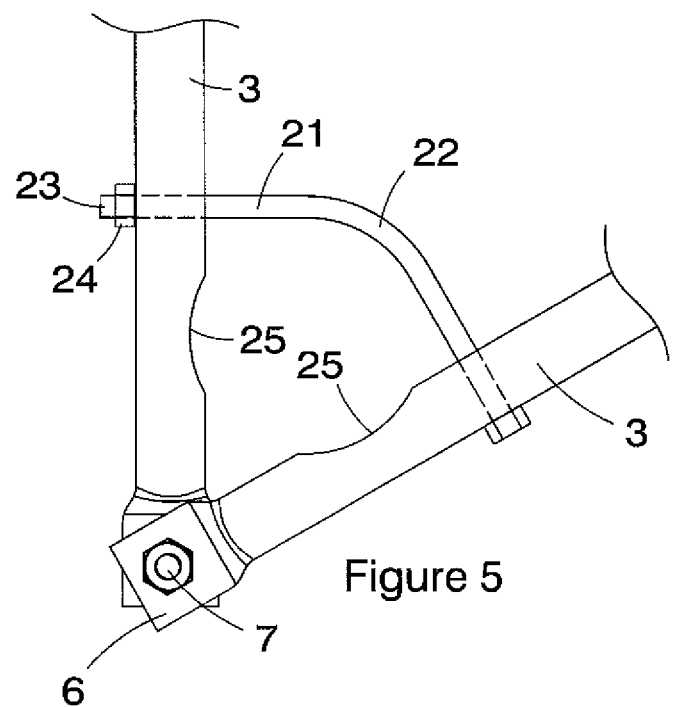
FIG. 5 is the same as FIG. 4 with the pylon removed so as to clearly illustrate the tubular frame members and associated fastener assembly.
Figure 6:
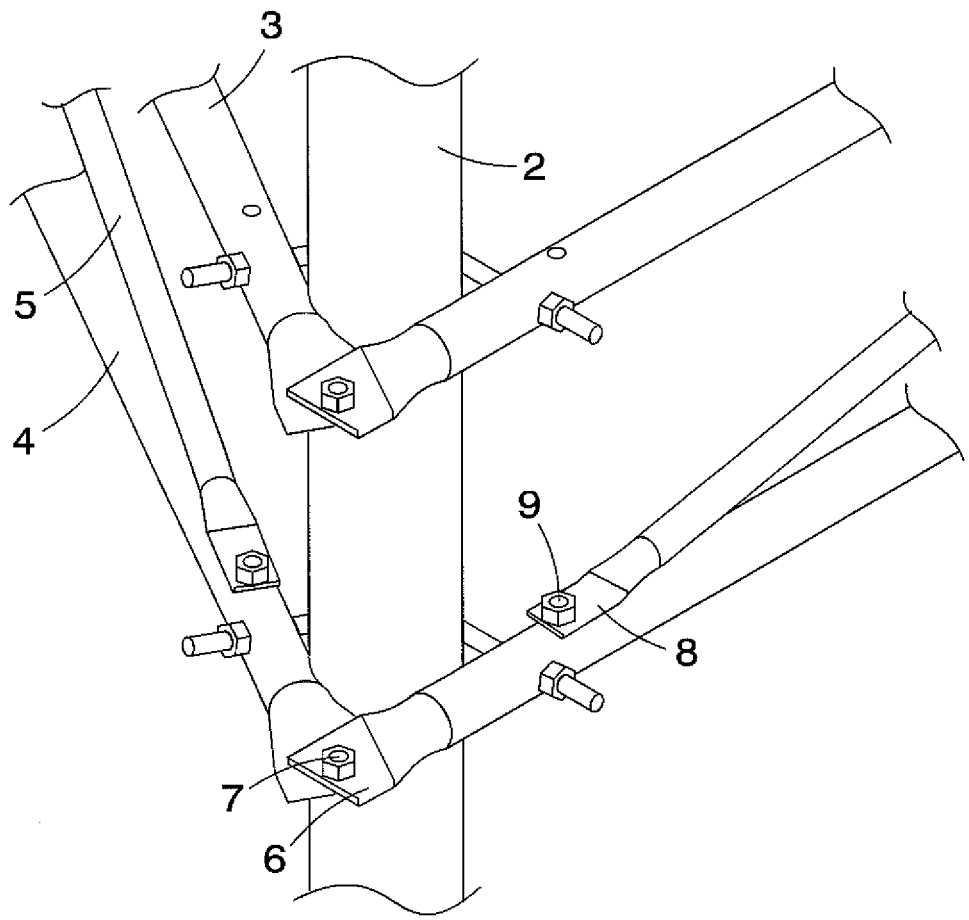
FIG. 6 is a three-dimensional view of one corner of the supporting frame assembly showing two trusses connected together at a corner of the assembly and one pylon secured thereto.
Figure 7:
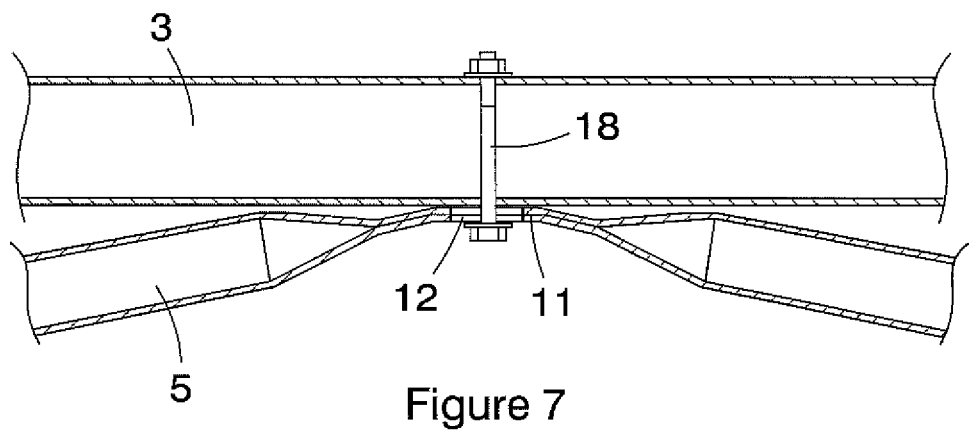
FIG. 7 is a sectional elevation detail showing the attachment of a tubular brace member secured to an upper straight frame member.
Figure 8:
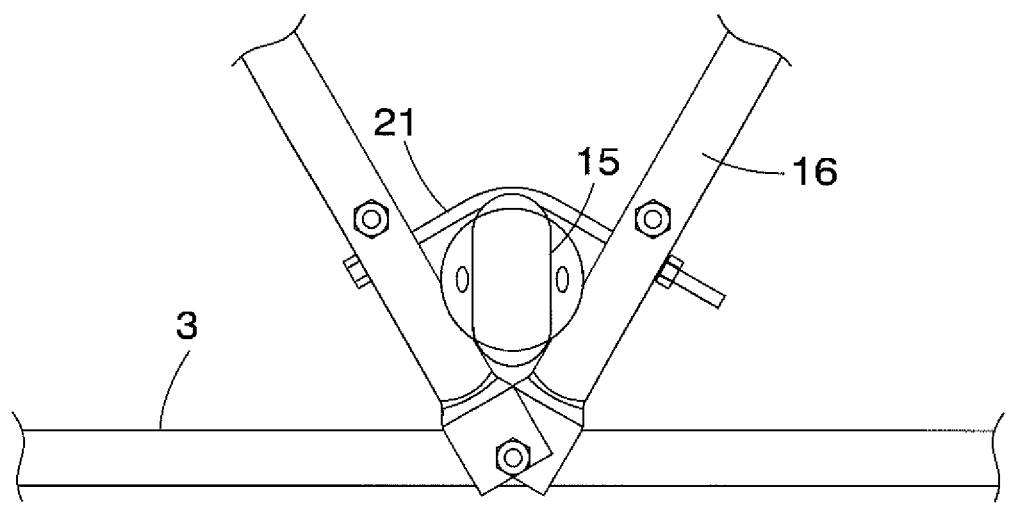
FIG. 8 illustrates, in plan view, the attachment of an intermediate pylon to a straight frame member.
Figure 9:
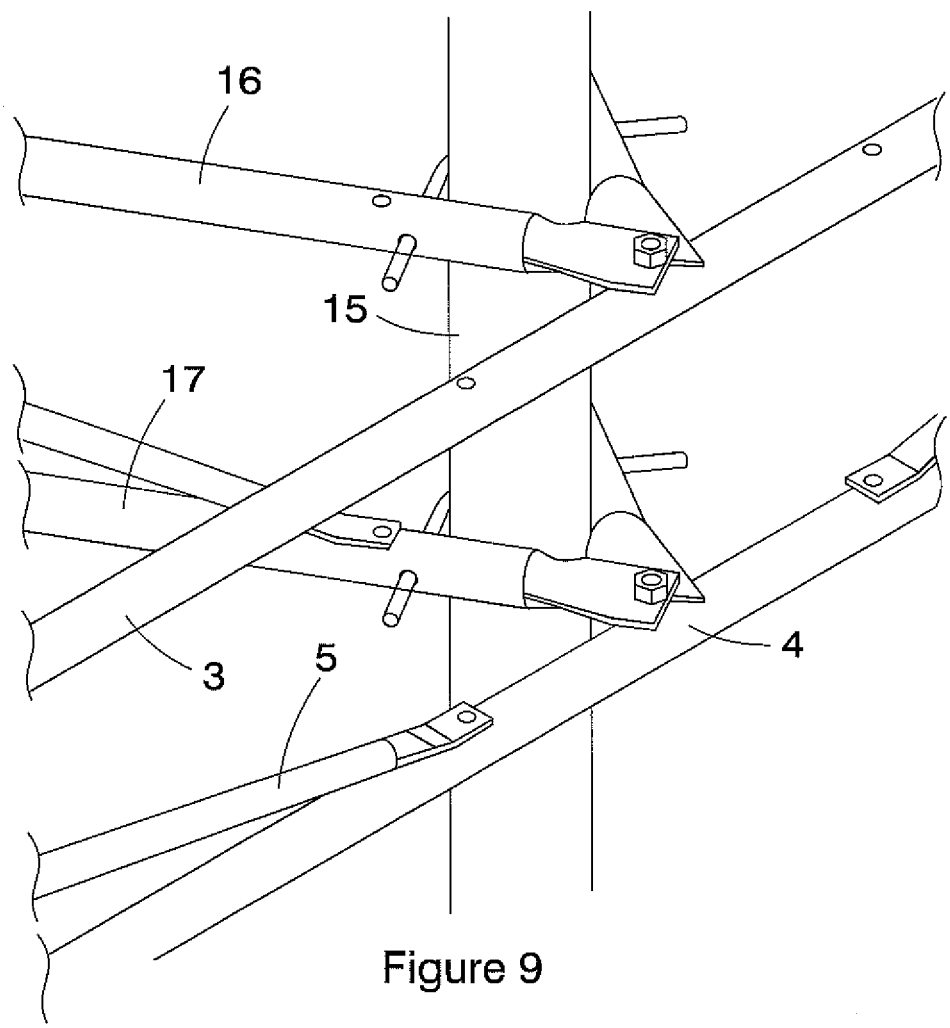
FIG. 9 is a three-dimensional view showing the attachment of trusses to each other where they intersect at a position where an intermediate pylon is supported by the frame assembly; and, FIG. 10 illustrates schematically in isometric view optional auxiliary components that may be used to stabilise a pylon should this be necessary.

The tubular brace members (5) are each composed of one half of the length of a standard commercially available tube and span between a position close to each pylon (2) and each intermediate pylon (15), as shown especially in FIG. 3. There is thus a single elongate tubular brace having its flattened central region secured to a central region of each span of the upper straight frame members (3, 16), and its two flattened end regions that are perforated and secured towards the end regions of the corresponding span of the lower frame members (4, 17).

The flattened central region (11) of each tubular brace is secured to the central region of the upper straight frame member (3,16) by means of a single screw threaded fastener (18) passing through the elongate slot (12) extending in the longitudinal direction so that it can accommodate alterations in the relative longitudinal positions of the upper and lower straight frame members that may be occasioned by undulations in a supporting surface that cannot be practically accommodated by axial adjustment of the pylons.

The frame members are, in each case, generally co-planar and the associated pylon is urged into the associated corner so as to extend at generally right angles to a generally horizontal plane including the two frame members. A fastener assembly in the form of a single elongate fastener (21) having an arcuate intermediate saddle portion (22) engaging a surface of the pylon that is directed outwardly relative to the corner so that the pylon is urged by the fastener assembly into the corner region. The saddle portion is formed to closely follow the outer surface of the pylon and the fastener has two straight screw threaded end portions (23) each of which passes through the associated frame member with a nut (24) engaging an outside of the associated frame member. The straight end portions extend transversely, typically at almost right angles, relative to the associated frame member. The nuts (24) associated with each screw threaded end are such that when tightened, the nuts cause the saddle portion to engage the pylon and lock it in its axial direction relative to the frame members in a selected position.

In order to enhance the gripping effect of the frame members on the pylon, the surfaces of the frame members engaged by the pylon are pre-formed to provide a curved contact surface (25) conforming substantially to the outer surface of the pylon that is engaged by the frame member.

In each instance the frame members and brace members are tubular and made of a deformable metal that can be pressed to flatten the ends or a central zone of the brace members and to provide said contact surfaces and flattened perforated ends of the frame members that are bolted together. It is therefore convenient to use galvanised iron or steel in the fabrication of the various components as the only fabrication procedure to be carried out is to cut the lengths at one position and a cut end can be relatively easily provided with adequate corrosion protection, unlike welded zones.

The adjustment of the axial positions of the individual pylons and intermediate pylons is enabled by the associated fastener assembly that bridges a corner between two joined straight frame or sub-frame members with the pylon firmly clamped between the end regions of the frame members and the fastener.

The arrangement described above therefore provides a pylon and generally horizontal supporting frame assembly in which the multiple frame members support multiple pylons extending at generally right angles to a plane of the frame assembly. Each pylon is height adjustable relative to the plane of the supporting frame assembly and has associated with it a releasable clamping assembly for clamping each pylon such that the pylon and supporting frame assembly is supported on a supporting surface with multiple pylons engaging the supporting surface. Preferably all of the pylons and intermediate pylons having their lowermost ends engaging the supporting surface.

Figure 10:
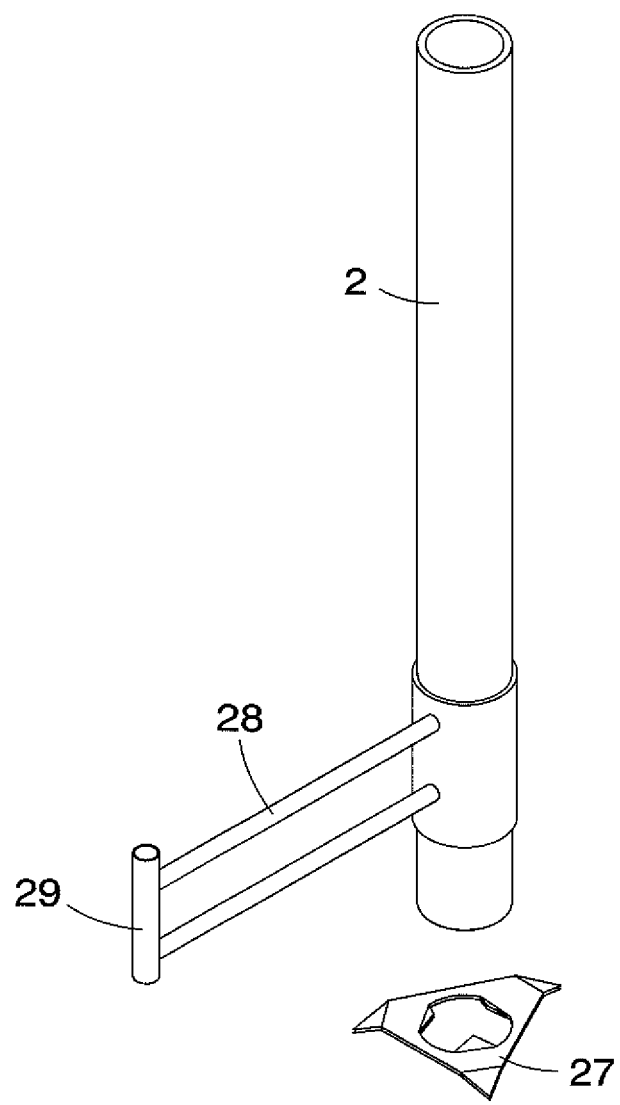

Of course, it may happen that the physical characteristics of the supporting surface are not particularly suitable in regions where some pylons are to engage the supporting surface and additional accessories such as a base plate (27) or radially extending leg (28) optionally having a sleeve (29) for receiving a laterally offset foot or a ground engaging screw (not shown). The latter are illustrated in FIG. 10.

In order to set up a pylon and supporting frame assembly as described above, the various pylons and frame members are assembled with associated brace members having central flattened regions loosely connected to the upper frame members. Once this has been achieved, the bolts connecting the overlapped flattened ends of the frame members can be tightened. The height of each pylon may be adjusted prior to clamping the pylon in a selected vertical position relative to the supporting frame assembly which is carried out by clamping the two vertically spaced fastener assemblies associated with the upper and lower straight frame members in position. This can be followed by tightening of the bolts that connect the flattened ends of the brace members to the lower frame members and finally by tightening the bolts that secure the flattened central region of the brace members to the upper frame members. Following the above procedure or any other suitable procedure will enable the entire assembly to be supported on a reasonably undulating surface without any difficulties. Each pylon will be firmly clamped in its operative position.

In the event that, over a period of time, stresses develop in the supporting frame assembly, the bolts connecting the central regions of the brace members to the upper frame members can be loosened and re-tightened with the stresses having been relieved. Other fasteners may be similarly loosened and then re-tightened It will be understood that the upper and lower frame members operate as two sides of a parallelogram in contradistinction to the instance in which trusses comprise upper and lower frame members that are firmly and immovably attached to each other by multiple diagonal brace members that are typically welded to the frame members thereby necessitating considerable manual labour and material input and also considerable additional corrosion protection.

The truss structure of this invention is much simpler than prior art arrangements as there is no welding and accompanying additional corrosion protection required.

Of course, the basic geometry of the frame assembly in plan view can be changed widely and need not be based on a triangle as in the embodiment described above. Thus, for example, the shape of the frame could be square, rectangular, or of any other polygonal shape such as hexagonal.

Numerous other variations may be made to the embodiment of the invention described above without departing from the scope hereof.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A supporting frame comprising:
   a truss comprising an upper straight frame member and a generally parallel lower straight frame member with each of the frame members supported at or towards its ends in spaced relationship relative to each other, and
   at least one single piece divergent inclined brace member extending between the upper straight frame member and lower straight frame member with two spans and respective ends of the divergent inclined brace member each being securable to the lower straight frame member by a fastener associated therewith, and
   wherein a flattened central region of the brace member is flattened in a plane parallel to the upper straight frame member and has an elongate longitudinal slot parallel to a longitudinal axis of the upper straight frame member for accommodating a fastener or fasteners passing through the flattened central region for allowing limited relative longitudinal movement of the upper straight frame member and lower straight frame member, wherein the relative longitudinal movement of the upper straight frame member and lower straight frame member operate as two sides of a parallelogram to relieve or avoid stresses in a supporting surface.

2. The supporting frame as claimed in claim 1, wherein the divergent inclined brace member is of deformable material that is selected from a group consisting of tubular section, angle section, and channel section and the free ends are flattened and secured to the lower straight frame member.

3. The supporting frame as claimed in claim 1, wherein the upper straight frame member and lower straight frame member are selected from a group consisting of tubular section, angle section, and channel section with their ends flattened configured for overlapping and attaching to corresponding ends of cooperating upper straight frame member or lower straight frame member of a co-operating truss at a relative angle.

4. The supporting frame as claimed in claim 3, wherein attached corresponding ends of upper straight frame members and lower straight frame members of cooperating trusses support a pylon at an inside surface of each of the attached corresponding ends with a fastener enclosing the pylon allowing the pylon to be adjusted vertically, and wherein one or more single piece divergent inclined brace member extends between two pylons.

5. A supporting assembly formed of a multitude of supporting frames as claimed in claim 1, wherein multiple trusses of the multiple supporting frames are provided in an inter-connected generally horizontal lattice and support a multitude of upright pylons.

6. The supporting assembly as claimed in claim 5, wherein the supporting assembly includes at least two trusses meeting at a corner with an upper straight frame member and a lower straight frame member of the two trusses being generally co-planar and the pylons being urge in a plane of the supporting frame into a corner between the frame members of each pair of trusses so as to extend at generally right angles to a plane including the upper straight frame member and the lower straight frame member of a supporting frame.

7. A supporting assembly formed of a multitude of supporting frames as claimed in claim 1, wherein three trusses operatively support three upright pylons, and
   wherein an upper straight frame of a first truss is attached to an upper straight frame of a second truss and an upper straight frame of a third truss to form a triangular upper frame of the supporting assembly, and
   wherein a lower straight frame of a first truss is attached to a lower straight frame of a second truss and a lower straight frame of a third truss to form a triangular lower frame of the supporting assembly, and
   wherein the elongate slots in the flattened central region of each of the brace members allows a plane of the triangular upper frame to move relative to a plane of the triangular lower frame prior to a fastener associated with each flattened central region being secured to fix the positions at which each divergent inclined brace member is attached to the respective upper straight frame member.

8. The supporting assembly as claimed in claim 7, wherein the three trusses support three shorter trusses of a triangular sub-frame arranged to connect midpoints of the three trusses and wherein an upright pylon is operatively supported at each of three corners of a resulting sub-frame.

* * * * *